United States Patent Office 2,716,106
Patented Aug. 23, 1955

2,716,106

MULTICOMPONENT POLYMERS OF VINYLIDENE CYANIDE

Harry Gilbert, Cuyahoga Falls, and Floyd F. Miller, Wadsworth, Ohio, assignors to The B. F. Goodrich Company, New York, N. Y., a corporation of New York No Drawing. Application January 26, 1952,
Serial No. 268,463

16 Claims. (Cl. 260—78.5)

This invention relates to novel multicomponent polymers and methods for the preparation thereof, and pertains more particularly to interpolymers of vinylidene cyanide with two other monoolefinic monomers, which interpolymers are extremely valuable synthetic resins, being especially useful in the preparation of excellent filaments, films and shaped articles.

Monomeric vinylidene cyanide is a clear liquid at room temperature and a crystalline solid at 0° C. It melts in the range of 6.0° C. to 9.7° C., and it boils at 40° C. at a reduced pressure of 5 mm. of mercury. The monomer is quite sensitive to water, undergoing on contact therewith at room temperature an instantaneous homopolymerization reaction to give a solid, water insoluble resin. Methods for the preparation of monomeric vinylidene cyanide are disclosed in U. S. Patents 2,476,270, 2,502,412 and 2,514,387.

In a series of copending applications, which will be referred to by serial number and filing date hereinbelow, it is disclosed that monomeric vinylidene cyanide polymerizes with other monoolefinic compounds to give two component copolymers which in general may be dissolved in solvents to give polymer solutions from which filaments and films are prepared which possess a great many useful properties including high tensile strength, and resistance to attack by chemicals, microorganisms, weather and the like. Many of these copolymers are further unique in that they are essentially 1:1 alternating copolymers, that is, copolymers possessing the structure:

$$-M_1-M_2(M_1-M_2)_xM_1-M_2-$$

wherein each $M_1$ is a vinylidene cyanide unit

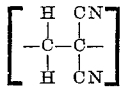

each $M_2$ is a unit of the second monoolefinic monomer and $x$ is a polydigit number. The fact that the copolymers thus obtained are essentially 1:1 alternating copolymers is determined by analysis of the copolymer which shows that the two monomers enter the polymer chain in essentially equimolar ratios regardless of the degree of monomer to polymer conversion and of charging ratio. Further supporting evidence for this fact is found in the copolymerization equation of F. M. Lewis, C. Walling et al., Journal of the American Chemical Society, Volume 70, page 1519 (1948):

$$\frac{d[M_1]}{d[M_2]}=\frac{[M_1]}{[M_2]}\cdot\frac{r_1[M^1]+[M_2]}{r_2[M_2]+[M_1]}$$

wherein $M_1$=concentration of unreacted monomer $M_1$
$M_2$=concentration of unreacted monomer $M_2$
$r_1$=ratio of the rate constants for the reaction of an $M_1$ type radical with $M_1$ and $M_2$ respectively
$r_2$=ratio of the rate constants for the reaction of an $M_2$ type radical with $M_2$ and $M_1$ respectively When the product of $r_1$ and $r_2$ (the values of $r_1$ and $r_2$ being determined by solving the equation for $r_1$ and $r_2$) is equivalent to 0, a 1:1 alternating copolymer is formed, that is, a two component copolymer having the $$-M_1-M_2(M_1-M_2)_xM_1-M_2-$$

structure shown hereinabove. It has been found that a number of monoolefinic compounds form the unique 1:1 alternating copolymers with vinylidene cyanide, as will be further explained hereinbelow.

However, while useful filaments, films and shaped articles can be prepared from two component copolymers of vinylidene cyanide with other monoolefinic compounds, such copolymers are sometimes difficult to dissolve in ordinary solvents. Moreover, they may be very high melting materials and have a relatively short melt life, so that difficulty is encountered in fabricating such copolymers into filaments, films and shaped articles. Also, vinylidene cyanide two component copolymers in general possess a high degree of crystallinity, a property which in itself is desirable in many applications, but which in applications such as injection molding is undesirable in that only opaque products can be obtained. Still another difficulty which may sometimes be encountered with two component copolymers of vinylidene cyanide is that such copolymers may not be easily dyed.

Accordingly, it is an object of the present invention to modify the properties obtained in vinylidene cyanide two component copolymers so that the resulting materials may be easily fabricated into filaments, films and shaped articles.

Another object of this invention is to provide interpolymers containing vinylidene cyanide and at least two other monoolefinic compounds, which interpolymers can be readily solvent spun, cast or molded.

Another object of this invention is to polymerize vinylidene cyanide with at least two monoolefinic compounds in such a manner as to obtain interpolymers with lower melt points and longer melt life than two component vinylidene cyanide copolymers.

It is still another object of this invention to prepare interpolymers containing vinylidene cyanide, which interpolymers can be readily fast dyed in the conventional manner to produce colored filaments, films and shaped articles.

It has now been discovered that the above and other objects are readily accomplished by polymerizing vinylidene cyanide with at least two other monoolefinic compounds, at least one of which forms an essentially 1:1 alternating two component copolymer when polymerized with vinylidene cyanide. The interpolymers thus obtained differ markedly in properties from the two component copolymers of vinylidene cyanide with monoolefinic compounds and are very valuable synthetic resins.

The monoolefinic compounds which are polymerized with vinylidene cyanide in accordance with the present invention are characterized in that they are polymerizable unsaturated compounds wherein the carbon to carbon unsaturation consists in a terminal methylene ($CH_2$) joined by an ethylenic double bond to its adjacent carbon, that is, having a $CH_2=C<$ group.

Compounds of the above type which form useful interpolymers with vinylidene cyanide in accordance with this invention include the following:

Monoolefinic hydrocarbons, that is, monomers containing only atoms of hydrogen and carbon, such as styrene, alpha-methyl styrene, alpha-ethyl styrene, alpha-butyl styrene, isobutylene (2-methyl propene-1), 2-methyl-butene-1, 2-methyl-pentene-1, 2,3-dimethyl-butene-1, 2,3-dimethyl-pentene-1, 2,4-dimethyl-pentene-1, 2,3,3-trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl-pentene-1, 2,3,4-trimethyl-pentene-1, 2,4,4-trimethyl-pentene-1, 2-methyl-octene-1 2,6-dimethyl-heptene-1, 2,6-dimethyl-octene-1, 2,3-dimethyl-decene-1, 2-methyl-nonadecene-1, ethylene, propylene, butylene, amylene, hexylene and the like;

Many of the hydrocarbons listed hereinabove, including for example, styrene and the alpha substituted styrenes, isobutylene and other olefins of the formula

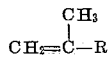

wherein R is an alkyl radical containing from 1 to 6 carbon atoms, form the unique 1:1 alternating copolymers with vinylidene cyanide;

Halogenated monoolefinic hydrocarbons, that is, monomers containing carbon, hydrogen and one or more halogen atoms, such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloro-monofluorostyrenes, 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1-diiodoethylene, 1,1,2,2-tetrafluoroethylene, 1,1,2,2-tetrachloroethylene, 1-chloro-2,2,2-trifluoroethylene and the like; among the above disclosed halogenated hydrocarbons which polymerize with vinylidene cyanide to give essentially 1:1 alternating copolymers are included the halogenated styrenes such as alpha-chlorostyrene, 2,5-dichlorostyrene and the like, vinyl and vinylidene halides such as vinyl chloride and vinylidene chloride, and 2-halogenated monoolefins such as 2-chloropropene, 2-fluorohexene, 2-chloroheptene and the like;

Monoolefinically unsaturated esters such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl arcylate, octyl acrylate, 3,5,5-trimethylhexyl acrylate, decyl acrylate and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-cholorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethylhexoate, allyl benzoate, allyl arcylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters as well as esters from such alkenyl alcohols as beta-ethyl allyl alcohol, beta-propyl allyl alcohol, 1-buten-4-ol, 2-methyl-buten-1-ol-4, 2(2,2-dimethylpropyl)-1-buten-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, diethyl fumarate, dimethallyl fumarate and diethyl glutaconate;

Many of the esters listed in the foregoing paragraphs form 1:1 alternating copolymers with vinylidene cyanide; included among these esters are vinyl acetate, vinyl benzoate and other vinyl esters of monocarboxylic acids such as vinyl alpha-chloroacetate, esters of methacrylic acid such as methyl methacrylate and butyl methacrylate, and isopropenyl esters of organic monocarboxylic acids such as isopropenyl acetate and isopropenyl isobutyrate;

Monoolefinically unsaturated organic nitriles such as acrylonitrile, methacrylonitrile, ethacrylonitrile, 1,1-dicyano propene-1,3-octenenitrile, crotonitrile, oleonitrile, and the like;

Monolefinically unsaturated carboxylic acids such as acrylic acid, methacrylic acid, crotonic acid, 3-butenoic acid, angelic acid, tiglic acid and the like.

Other polymerizable monoolefinic monomers may also be polymerized in combinations of two or more with vinylidene cyanide to form the interpolymers of the present invention. Consequently the invention includes within its scope interpolymers of vinylidene cyanide with any two or more polymerizable monomers containing a single $CH_2=C<$ group, at least one of which forms an essentially 1:1 alternating copolymer with vinylidene cyanide.

The vinylidene cyanide component of the interpolymers of this invention is generally present in the polymer in substantially 50 mole per cent, regardless of the quantity of vinylidene cyanide charged. However, the respective quantities of the remaining monoolefinic monomers entering the polymer chain may be varied widely while still obtaining interpolymers which possess properties not possessed by two component copolymers of vinylidene cyanide with other monoolefinic compounds. For example, tripolymers containing as little as 2 mole per cent of any of the two or more monomers polymerized with vinylidene cyanide can be prepared and such polymers differ markedly in properties from vinylidene cyanide two component copolymers.

The quantity of the monoolefinic monomers entering the polymer chain in forming the interpolymers of this invention may be accurately controlled in most instances simply by varying the charging ratio of said monomers. To illustrate, the examples hereinbelow show that the monomers polymerized with vinylidene cyanide may be charged in amounts as low as about 0.5 mole or as high as about 10 moles for each mole of vinylidene cyanide. Moreover, said monomers may be charged in even smaller or larger quantities than shown in the specific examples while still obtaining interpolymers which differ in properties from vinylidene cyanide two component copolymers. It is to be understood, of course, that the amounts of the monomers to be charged in any given polymerization will in general vary according to the ease with which said monomer enters the polymer chain. For example, it has been found that when vinylidene cyanide is polymerized with two or more monoolefinic monomers, each of which form alternating copolymers therewith when polymerized with vinylidene cyanide alone, said monomers enter the polymer chain in proportion to the quantity of each charged, so that any desired quantity of such monomer can be obtained in the polymer by proper control of the monomer charging ratios. However, when vinylidene cyanide is polymerized with two other monoolefinic monomers, one of which when polymerized with vinylidene cyanide alone forms an essentially 1:1 alternating copolymer, and the other a monomer which does not form an essentially 1:1 alternating copolymer with vinylidene cyanide, this latter monomer can not be introduced into the polymer chain in any appreciable quantity, although even the small amounts of this type of monomer which do enter the polymer chain affect to a marked degree the properties of the resulting interpolymer.

It is disclosed in the copending applications referred to hereinabove that vinylidene cyanide polymerizes ionically in the presence of a number of substances which provide ions, for example, water, alcohols, esters, ketones and the like to form a homopolymer which is of low molecular weight (below 25,000) and of little or no practical value. In preparing the interpolymers of the present invention, therefore, care must be taken to prevent entirely or reduce to a minimum this ionic homopolymerization of vinylidene cyanide monomer. This is best accomplished by carrying out the polymerization in a completely organic medium, that is, in a single phase, since when the polymerization is carried out in a two phase or emulsion system, the vinylidene cyanide polymerizes spontaneously by an ionic mechanism to form the low molecular weight homopolymer described hereinabove. It is also desirable that the polymerization be carried out in the presence of a very active free radical polymerization catalyst. In this manner the tendency for ionic homopolymerization of the vinylidene cyanide to occur is greatly repressed or eliminated altogether and high conversions of monomer to polymer are secured.

In the preferred manner of carrying out the polymerization of vinylidene cyanide with two or more other monoolefinic monomers, the monomers are first dissolved in a liquid aromatic hydrocarbon such as benzene, chlorobenzenes, toluene, methyl toluene, or the like, preferably in an amount such that the solvent comprises from 50 to 80% or more by weight of the total solution. A free radical polymerization catalyst is added to the solution and the resulting mixture heated to a temperature of from —15° C. to 100° C., preferably at 0° C. to 60° C., whereupon polymerization occurs to form the desired interpolymer as a white powder of small particle size, the polymerization requiring approximately ½ to 20 hours in most instances. The interpolymer thus formed may be separated from the polymerization medium simply by filtering, or if desired the polymerization medium can be separated from the polymer and recovered by distillation.

A second method of polymerization, less desirable than the above method, but which may be utilized successfully, consists in agitating the monomers in a liquid aliphatic hydrocarbon (in which vinylidene cyanide monomer is only very slightly soluble), for example, hexane or heptane, and heating in the presence of a free radical polymerization catalyst whereupon the interpolymer forms and may be separated from the polymerization medium by filtering or removing the polymerization medium by distillation.

An alternative method of polymerization, especially convenient in the preparation of interpolymers of vinylidene cyanide wherein one or more of the components of said interpolymer is a vinyl ester of an aliphatic monocarboxylic acid such as vinyl acetate, consists in utilizing a relatively large excess of said vinyl ester as a polymerization medium for the other monomers. By carrying out the polymerization in this manner it is not necessary to employ other liquid substances as the polymerization medium.

The polymerization may also be carried out on a continuous basis simply by adding, continuously or intermittently, fresh quantities of the monomers, and also of catalyst and solvent or diluent, if desired, to the polymerization mixture during the course of the polymerization.

The catalysts utilized in preparing the interpolymers of the present invention are those which form free radicals at the polymerization temperature, and particularly those which are very active free radical type materials, since it is desirable that the polymerization proceed as rapidly as possible in order that the ionic homopolymerization of the vinylidene cyanide can not occur in an appreciable amount.

One useful class of catalysts comprises compounds of the structure

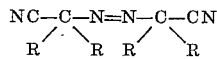

wherein each R is a hydrocarbon radical. Examples of compounds of this class include alpha, alpha'-azodiisobutyronitrile, alpha, alpha'-azobis(alpha, beta-dimethylbutyronitrile), alpha, alpha'-azobis(alpha-cyclopropionitrile), and the like. The use of this type of catalysts in preparing polymers of vinylidene cyanide is disclosed in copending application, Serial No. 288,562, filed May 17, 1952. Diazo compounds other than those which possess the above structure are not useful in the polymerization process as they initiate the ionic homopolymerization of the vinylidene cyanide monomer to the extent that none of the desired interpolymer is obtained.

Other catalysts which are useful in the polymerization include the peroxygen compounds such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, tetralin peroxide, and the like.

The quantity of catalyst utilized is not critical and may be varied widely. In general, however, from 0.01 to 5% by weight of the catalyst (based on the total weight of monomers charged) is utilized, although smaller or larger amounts may be employed if desired.

The following examples illustrate more fully the preparation of interpolymers of vinylidene cyanide with two or more monoolefinic monomers. The examples are not, however, to be construed as a limitation upon the scope of the invention, for there are, of course, numerous possible variations and modifications in the procedures described. In the examples all parts are by weight.

EXAMPLES I AND II

Tripolymers of vinylidene cyanide, vinyl acetate and acrylonitrile are prepared by dissolving varying quantities of the three monomers in benzene, adding o,o'-dichlorobenzoyl peroxide, and maintaining the temperature at 40° C. for 1 hour, whereupon polymerization occurs to form the tripolymer as a hard, resinous solid of small particle size. The charging ratios, quantity of catalyst utilized, and the softening point of the tripolymer are set forth in Table I below:

*Table I*

| Example | I | II |
|---|---|---|
| Parts vinylidene cyanide charged | 9.05 | 9.00 |
| Parts vinyl acetate charged | 10.00 | 10.00 |
| Parts acrylonitrile charged | 6.1 | 11.2 |
| Parts catalyst | 0.025 | 0.02 |
| Softening point of polymer ° C. | 230 | 235 |

A vinylidene cyanide-vinyl acetate copolymer prepared according to the above method softens at about 180° C. It will be seen, therefore, that acrylonitrile has the effect of increasing the softening point when it is introduced into the vinylidene cyanide, vinyl ester polymerization system.

EXAMPLES III AND IV 2.1 parts of vinylidene cyanide, 16.6 parts of vinyl acetate and .01 part of o,o'-dichlorobenzoyl peroxide are placed in a stainless steel reaction bomb. The mixture is then heated at 40°–45° C., and ethylene at 20,000 p. s. i. is charged into the bomb for 1 hour. A hard, resinous tripolymer is obtained which softens at 160° C. and which is soluble in dimethyl formamide. A copolymer of vinylidene cyanide and ethylene, however, is insoluble in dimethyl formamide.

EXAMPLES V TO VIII

A solution is prepared by admixing 154 parts of vinyl acetate, 20 parts of vinylidene cyanide and 0.052 part of o,o'-dichlorobenzoyl peroxide. Methyl methacrylate is then added to four 20 part portions of the above solution, the methacrylate being added in the following amounts:

|  | Parts |
|---|---|
| V | 2.34 |
| VI | 2.81 |
| VII | 3.74 |
| VIII | 4.68 |

The resulting mixtures are then heated at 50° C. for about 5 hours and a resinous tripolymer is obtained in the form of small, hard particles. The tripolymers of Examples V and VI are insoluble in acetone at room temperature, the polymer of Example VII gels in acetone at room temperature, and the polymer of Example VIII is soluble in acetone at room temperature. It can be seen, therefore that the addition of an alkyl methacrylate to the vinylidene cyanide, vinyl ester copolymer system results in increased solubility in the resulting tripolymer.

EXAMPLE IX

A mixture of 3.8 parts of vinylidene cyanide, 4.1 parts of vinyl acetate, 5.0 parts of styrene and 0.013 part of o,o'-dichlorobenzoyl peroxide are heated at 40° C. for 30 minutes. A solid tripolymer softening at 160° C. and being soluble in acetone is obtained.

EXAMPLE X

A mixture is prepared utilizing 0.048 mole of vinylidene cyanide, 0.0216 mole of vinyl acetate and 0.024 mole of o-chlorostyrene. The mixture is then maintained for 18 hours at 20° C. and a soft but solid polymer is obtained. No catalyst is necessary to effect the polymerization in this particular system, since the o-chlorostyrene functions as a free radical initiator.

EXAMPLES XI TO XIV

A series of vinylidene cyanide, styrene, vinylidene chloride tripolymers are prepared by dissolving varying quantities of the three monomers in benzene, adding 0.15 per cent of a peroxide catalyst (based on total monomer weight), and heating the resulting solution at 50° C. to give the desired tripolymer. The monomer charging ratios and other pertinent data are recorded in Table III.

Table III

| Example | XI | XII | XIII | XIV |
|---|---|---|---|---|
| Mole percent vinylidene cyanide charged | 33.33 | 50.00 | 14.30 | 14.30 |
| Mole percent styrene charged | 33.33 | 25.00 | 71.40 | 14.30 |
| Mole percent vinylidene chloride charged | 33.33 | 25.00 | 14.30 | 71.40 |
| Mole percent vinylidene cyanide in polymer | 52.68 | 53.02 | 50.54 | 50.50 |
| Mole percent styrene in polymer | 45.49 | 44.65 | 47.57 | 45.18 |
| Mole percent vinylidene chloride in polymer | 1.83 | 2.32 | 1.89 | 4.32 |

All of the above polymers are hard, resinous materials which are substantially unaffected by 2% aqueous sodium hydroxide.

It will be noted from the above examples that styrene has a much greater tendency to unite with vinylidene cyanide than does vinylidene chloride, so that regardless of the quantity of vinylidene chloride charged, only relatively small amounts enter the polymer chain. However, the small quantities of vinylidene chloride which do enter the polymer chain cause marked differences in properties of the resulting tripolymer as compared to the properties of a vinylidene cyanide, isobutylene copolymer.

Moreover, when Examples IX to XIV are repeated substituting isobutylene or ethyl acrylate for the styrene, the resulting tripolymers are again hard, resinous solids which are substantially unaffected by prolonged exposure to aqueous alkali.

EXAMPLES XV TO XVII

Tripolymers of vinylidene cyanide, vinyl acetate and vinyl chloride are prepared as in Examples XI to XIV. The monomer charging ratios and polymer composition are tabulated below:

Table IV

| Example | XV | XVI | XVII |
|---|---|---|---|
| Mole percent vinylidene cyanide charged | 33.33 | 14.30 | 14.30 |
| Mole percent vinyl acetate charged | 33.33 | 71.40 | 14.30 |
| Mole percent vinyl chloride charged | 33.33 | 14.30 | 71.40 |
| Mole percent vinylidene cyanide in polymer | 52.69 | 47.99 | 49.16 |
| Mole percent vinyl acetate in polymer | 27.91 | 40.29 | 17.74 |
| Mole percent vinyl chloride in polymer | 19.40 | 11.72 | 33.09 |

Examples XV to XVII demonstrate that an excess of either vinyl acetate or vinyl chloride gives polymers which become more rich in the component in excess. The polymers thus obtained exhibit excellent alkali stability which is surprising in view of the fact that copolymers of vinylidene cyanide with vinyl chloride tend to decompose in the presence of aqueous alkali.

EXAMPLES XVIII TO XXIII

A series of tripolymers is prepared by admixing monomeric vinylidene cyanide, methyl methacrylate and vinylidene chloride in benzene solution, adding 0.15 by weight of o,o'-dichlorobenzoyl peroxide (based on the total monomer charge) and then heating the resulting mixture to a temperature of about 40° C. whereupon polymerization takes place to give the tripolymer in the form of a hard resinous solid. The monomer charging ratios, polymer composition and polymer softening point are tabulated below:

Table V

| Example | XVIII | XIX | XX | XXI | XXII | XXIII |
|---|---|---|---|---|---|---|
| Mole percent vinylidene cyanide charged | 2.54 | 9.99 | 18.39 | 23.88 | 35.01 | 45.62 |
| Mole percent methyl methacrylate charged | 89.27 | 87.98 | 66.81 | 23.26 | 22.72 | 22.41 |
| Mole percent vinylidene chloride charged | 8.19 | 2.00 | 14.78 | 52.89 | 42.56 | 32.13 |
| Mole percent vinylidene cyanide in polymer | 29.34 | 39.99 | 44.55 | 56.99 | 61.84 | 59.55 |
| Mole percent methyl methacrylate in polymer | 69.08 | 58.34 | 51.59 | 28.64 | 26.19 | 29.36 |
| Mole percent vinylidene chloride in polymer | 1.09 | 0.712 | 3.78 | 14.64 | 11.72 | 11.11 |
| Polymer softening point, ° C | 18 | 151 | 160 | 177 | 179 | 184 |

The above examples indicate that the polymer softening temperature is increased with an increase in the vinylidene cyanide content of the polymer. It has also been found that as the softening temperature is increased the resistance to alkaline solutions also increases.

EXAMPLES XXIV TO XXVII

Tripolymers of vinylidene cyanide, isobutylene and vinylidene chloride are prepared according to the method of Examples XVIII to XXIII. The monomer charging ratios and the per cent of each component in the tripolymer are tabulated below:

*Table VI*

| Example | XXIV | XXV | XXVI | XXVII |
|---|---|---|---|---|
| Mole percent vinylidene cyanide charged | 14.30 | 14.30 | 33.33 | 50.00 |
| Mole percent isobutylene charged | 14.30 | 71.40 | 33.33 | 25.00 |
| Mole percent vinylidene chloride charged | 71.40 | 14.30 | 33.33 | 25.00 |
| Mole percent vinylidene cyanide in polymer | 49.26 | 44.64 | 46.43 | 70.26 |
| Mole percent isobutylene in polymer | 47.25 | 54.71 | 45.75 | 28.52 |
| Mole percent vinylidene chloride in polymer | 3.50 | 0.66 | 7.82 | 1.22 |

The polymers of the above examples are hard, resinous, heat-softenable solids which possess excellent resistance to the action of alkalis and acids.

EXAMPLES XXVIII TO XXX

Examples XXIV to XXVII are repeated except that ethyl acrylate is substituted for the isobutylene. The pertinent data are recorded below:

*Table VII*

| Example | XXVIII | XXIX | XXX |
|---|---|---|---|
| Mole percent vinylidene cyanide in charge | 14.30 | 14.30 | 33.33 |
| Mole percent ethyl acrylate in charge | 71.40 | 14.30 | 33.33 |
| Mole percent vinylidene chloride in charge | 14.30 | 71.40 | 33.33 |
| Mole percent vinylidene cyanide in polymer | 44.39 | 42.36 | 48.11 |
| Mole percent ethyl acrylate in polymer | 36.82 | 9.51 | 14.61 |
| Mole percent vinylidene chloride in polymer | 18.79 | 48.13 | 37.28 |

The above tripolymers exhibit excellent alkali stability. In this characteristic they differ considerably from either vinylidene cyanide ethyl acrylate copolymers or vinylidene cyanide vinylidene chloride copolymers, both of which tend to be very alkaline sensitive.

EXAMPLE XXXI

The following tripolymers, containing vinylidene cyanide and two other monomers, at least one of which forms an essentially 1:1 alternating copolymer with vinylidene cyanide are prepared according to the method of Examples I and II.

a. Vinylidene cyanide, methyl methacrylate, acrylonitrile
b. Vinylidene cyanide, methyl methacrylate, 2-chloropropene
c. Vinylidene cyanide, vinyl acetate, chloroethyl acrylate
d. Vinylidene cyanide, vinyl acetate, vinyl chloride
e. Vinylidene cyanide, vinyl acetate, vinylidene chloride
f. Vinylidene cyanide, vinyl acetate, 2-chloropropene
g. Vinylidene cyanide, styrene, acrylonitrile
h. Vinylidene cyanide, styrene, isobutylene In each instance, the resulting tripolymer is a resinous, heat-softenable solid which is soluble in dimethyl formamide to give solutions from which excellent fibers and films are readily prepared. Moreover, each of the tripolymers possess advantageous properties not possessed by copolymers of vinylidene cyanide with either of the two remaining monomers.

From the foregoing description of the invention, it will be seen that the interpolymers of the present invention constitute a new and useful class of polymeric materials. It is apparent, therefore, that various embodiments of the invention, in addition to those specifically disclosed, may be provided without departing from the spirit and scope of the invention as defined in the appended claims.

We claim:

1. An interpolymer comprising vinylidene cyanide copolymerized with two other monoolefinic monomers copolymerizable therewith, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin.

2. An interpolymer comprising vinylidene cyanide copolymerized with a monoolefinic monomer having the $CH_2\!=\!C\!<$ group, and another monoolefinic monomer copolymerizable therewith, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin.

3. An interpolymer comprising vinylidene cyanide copolymerized with two other monoolefinic monomers copolymerizable therewith, each said monoolefin having a $CH_2\!=\!C\!<$ group, the vinylidene cyanide component being derived from monomeric vinylidene cyanide which is a crystalline solid at 0° C., having a melting point when in purest form of substantially 9.0° to 9.7° C., and being characterized chemically by the ability to undergo on contact with water at room temperature an instantaneous homopolymerization reaction to give a solid water-insoluble resin.

4. An interpolymer comprising vinylidene cyanide copolymerized with a vinyl ester of an aliphatic monocarboxylic acid and another polymerizable monoolefinic monomer, the vinylidene cyanide component being derived from monomeric vinylidene cyanide which is a crystalline solid at 0° C., having a melting point when in purest form of substantially 9.0° to 9.7° C., and being characterized chemically by the ability to undergo on contact with water at room temperature an instantaneous homopolymerization reaction to give a solid water-insoluble resin.

5. A tripolymer of vinylidene cyanide, vinyl acetate and vinyl chloride, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin.

6. A tripolymer of vinylidene cyanide, vinyl acetate and styrene, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin.

7. A tripolymer of vinylidene cyanide, vinyl acetate and methyl methacrylate, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin.

8. An interpolymer comprising vinylidene cyanide copolymerized with a monoolefin of the structure

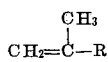

wherein R is an alkyl radical, and one other polymerizable monoolefinic monomer having the CH$_2$=C< group, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin.

9. A tripolymer of vinylidene cyanide, isobutylene and vinylidene chloride, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin.

10. An interpolymer comprising vinylidene cyanide copolymerized with a monoolefin of the structure

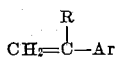

wherein Ar is an aromatic radical in which all of the hydrogen atoms are attached to carbon atoms and R is a member of the class consisting of hydrogen and alkyl radicals, and another polymerizable monoolefinic monomer, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin.

11. A tripolymer of vinylidene cyanide, styrene and vinylidene chloride, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin.

12. The method which comprises admixing vinylidene cyanide which is a liquid at room temperature and a crystalline solid at 0° C., having a melting point when in purest form of substantially 9.0° C. to 9.7° C., and is characterized chemically by the ability to undergo on contact with water at room temperature an instantaneous homopolymerization reaction to give a water-insoluble resin, and two other copolymerizable monoolefinic monomers, adding a polymerization catalyst whereupon polymerization occurs to form an interpolymer of vinylidene cyanide copolymerized with said other polymerizable monoolefinic compounds.

13. The method which comprises dissolving in a liquid aromatic hydrocarbon vinylidene cyanide which is a liquid at room temperature and a crystalline solid at 0° C., having a melting point when in purest form of substantially 9.0° C. to 9.7° C., and is characterized chemically by the ability to undergo on contact with water at room temperature an instantaneous homopolymerization reaction to give a water-insoluble resin, with two other copolymerizable monoolefinic monomers at least one of which has the CH$_2$=C< group, and adding a polymerization catalyst whereupon polymerization occurs to form an interpolymer of vinylidene cyanide with said other polymerizable monoolefinic compounds.

14. The method of claim 11 wherein the liquid aromatic hydrocarbon is a member of the class consisting of benzene and halogenated benzenes.

15. The method which comprises dissolving in a liquid aromatic hydrocarbon vinylidene cyanide which is a liquid at room temperature and a crystalline solid at 0° C., having a melting point when in purest form of substantially 9.0° C. to 9.7° C., and is characterized chemically by the ability to undergo on contact with water at room temperature an instantaneous homopolymerization reaction to give a water-insoluble resin, a vinyl ester of an aliphatic monocarboxylic acid and another polymerizable monoolefinic monomer, and adding a polymerization catalyst whereupon polymerization occurs to form an interpolymer of vinylidene cyanide copolymerized with said vinyl ester and said other polymerizable monoolefinic monomers.

16. The method of claim 15 wherein the vinyl ester of an aliphatic monocarboxylic acid is vinyl acetate and the monoolefinic monomer is methyl methacrylate.

References Cited in the file of this patent
UNITED STATES PATENTS
2,466,395   Dickey _____ Apr. 5, 1949